United States Patent Office 3,538,312
Patented Nov. 3, 1970

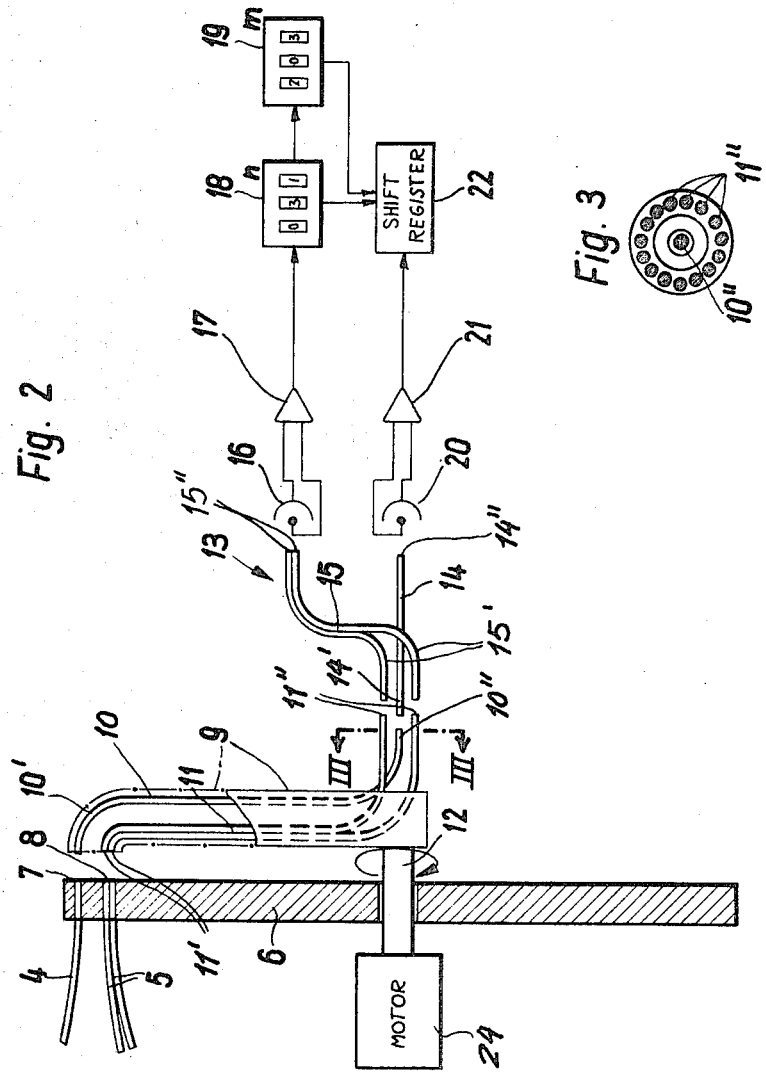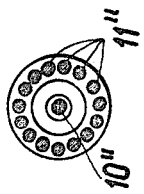

3,538,312
ORTHOGONAL FIBER-OPTICAL SCANNER
Rudolf Genähr, Bad Kreuznach, Germany, assignor to Jose Schneider Feinwerktechnik G.m.b.H. Optische Werke, Bad Kreuznach, Germany, a corporation of Germany
Filed Mar. 8, 1967, Ser. No. 621,600
Claims priority, application Germany, Mar. 11, 1966, Sch 38,643
Int. Cl. G02b 5/16
U.S. Cl. 235—92
7 Claims

ABSTRACT OF THE DISCLOSURE

Device for registering in orthogonal co-ordinates the position of one or more luminous points on a surface, comprising an orthogonal array of input ends of a bundle of light-conductive filaments divided into $n$ columns and $m$ rows. The opposite or output ends of the filament bundle are sequentially disposed along the periphery of a circular disk, with the filaments from successive rows occupying successive arcs along the circle. A fiber-optical scanner rotates around the center of the circle and picks up timing pulses from pinpoint light sources placed next to the output ends of the filaments on the disk; any illuminated filament gives rise to a trigger pulse which is sensed by the scanner together with or just after an associated timing pulse and actuates a register to store or display the reading of two counters—one for the number $m$ of rows, the other for the number $n$ of timing pulses in a row—which are stepped by the timing pulses as the scanner rotates.

---

My present invention relates to a device for registering, in orthogonal co-ordinates, the position of one or more luminous points on a surface, e.g. on a screen upon which such point or points are projected by optical or electronic means. Such a device may be used, for example, to evaluate radar or sonar signals, to determine the location of celestial bodies in space navigation, or to track submolecular particles in cloud or bubble chambers.

It is known, e.g. from U.S. Pat. No. 3,184,732, to use fiber-optical elements in converting analog positions of luminous signals into digital information. Such prior systems, however, require complex circuitry for the ascertainment of a target position in two dimensions along mutually perpendicular co-ordinate axes.

The general object of my present invention is to provide a simple and versatile device for registering such target positions in terms of orthogonal co-ordinates.

This object is realized, pursuant to the present invention, by the provision of a bundle of light-conductive filaments, e.g. of glass or plastic material as conventionally used in fiber optics, whose input ends are arranged in an orthogonal array of $n$ columns and $m$ rows to provide a total of $nm$ discrete locations. The output ends of the filaments are distributed, with slight peripheral spacing, in a circle which is subdivided into $m$ arcs each containing the $n$ output ends of a respective row. A scanner, which may be of the general type described in commonly assigned copending application Ser. No. 582,926 filed Sept. 29, 1966 by Erich Schwab and me, now Pat. No. 3,461,304, picks up a control pulse from any of these output ends whose filament is illuminated by a light signal registering with its input end. A timer, advantageously including a multiplicity of pinpoint light sources respectively juxtaposed with the aforementioned output ends, generates a stepping pulse whenever the scanner moves past one of these output ends, the number of pinpoint sources corresponding to or being a multiple of the number $mn$ of the bundled filaments. Two counters, one for the columns and one for the rows, respond to the output of the timer, the first counter being directly stepped by the timing pulses whereas the second counter advantageously is advanced by a signal emitted by the first counter whenever the latter returns to zero upon being stepped past its $n$th position. The arrival of a control pulse from the scanner, indicative of the presence of an illuminated filament, causes the instantaneous reading of the two counters to be registered, either by arresting the counters (if the system is only required to register the location of a single point) or by transferring their counts to a suitable register for visual display, temporary storage and/or transmittal to a recording medium.

The invention will be described in greater detail with reference to the accompanying drawing in which:

FIG. 2 is a cross-sectional view taken on the line II—II of FIG. 1; and

FIG. 3 is a sectional detail view taken on the line III—III of FIG. 2.

Figure 1:
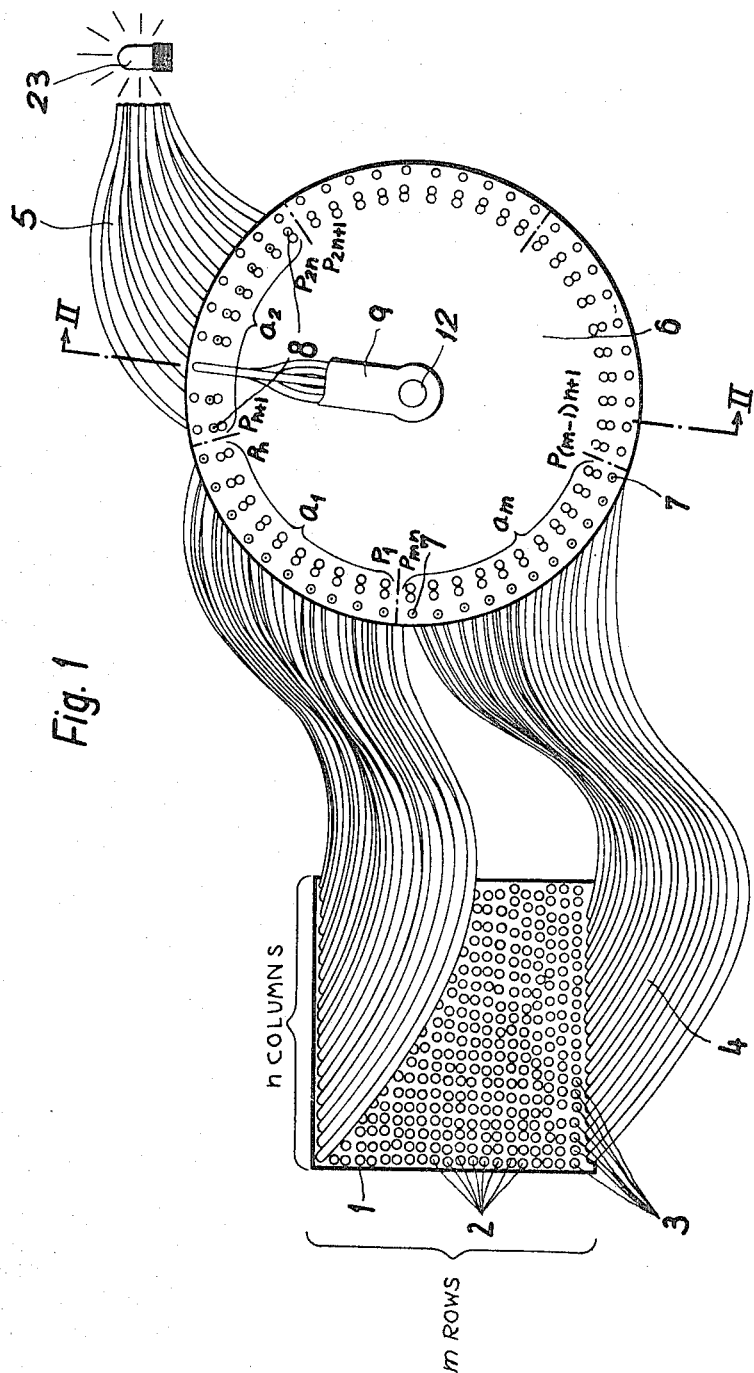
FIG. 1 is a simplified perspective of a system according to the invention.

In FIG. 1 I have shown a rectangular element 1 which may be juxtaposed with an information carrier, such as a ground-glass plate or an oscilloscope screen, or upon which an image of one or more luminous points may be optically projected. The rear surface of element 1 is orthogonally subdivided into $n$ columns 3 and $m$ rows 2 defined by an array of input ends of light-conductive fibers 4 of which only the top and bottom rows have been illustrated. The output ends 7 of these fibers are disposed in a circle along the periphery of a disk 6 penetrated thereby, the circle being subdivided into $m$ arcs $a_1, a_2 \ldots a_m$ each containing the $n$ output ends of a respective row 2. The representation of this circular array of output ends has been simplified, for the sake of clarity, by a showing of only five such arcs although their number $m$ as well as the number $n$ of filaments per arc will in reality be much greater.

Another bundle of optical fibers 5, having their input ends constantly illuminated by a light source 23, terminate at locations 8 closely juxtaposed with the output ends 7 of filaments 4. The fiber ends 8 represent pinpoint light sources which, in the embodiment illustrated, are in peripheral alignment with the fiber ends 7 although such alignment is not absolutely necessary. Moreover, FIGS. 1 and 2 show two radially adjoining fiber ends 8 next to each fiber end 7 so that, in this particular case, the number of fibers 5 is double the number $mn$ of fibers 4; the number of these light sources 8 on any radius may be increased at will.

Disk 6 is fixedly positioned and penetrated by a shaft 12 of a continuously rotating electromotor 24 to which a radially extending arm 9 is secured. Arm 9 acts as a carrier for a single filament 10 and a group of filaments 11 having input ends 10', 11' disposed for successive confrontation of the output ends 7 and 8, respectively. Fibers 11, having only two input terminations 11', are split into a larger number of output terminations 11" which, as best seen in FIG. 3, form a tubular sheath around the axially disposed output end 10" of fiber 10. A similar tubular sheath of input extremities 15' of a group of stationary fiber-optical elements 15 confront the terminations 11" while the input end 14' of an axially disposed stationary light conductor 14 forms a like extension of output end 10" of conductor 10. Fibers 11 and 15 form part of a timing circuit 13 which also includes a photocell 16 confronting the two or more output ends 15" of filaments 15. A similar photocell 20 is positioned for illumination by the output end 14" of scanning conductor 14. Photocell 16 works into an amplifier 17 whose output is fed to a digital (preferably decadic) pulse counter 18 having a total number of $n$ positions. A second, similar pulse counter 19, with a total of $m$ positions, is controlled by the counter 18 so as to constitute a second counting stage in cascade with stage 18. Another amplifier 21, energized from photocell 20, has its output connected to a control terminal of a shift register 22 adapted to receive the readings of counters 18 and 19.

In operation, a stepping pulse is produced at photocell 16 whenever the input ends 11' of filaments 11 move from one pair of aligned output ends 8 to the next, there being thus $n$ such stepping pulses during the traverse of any of arcs $a_1$, $a_2$ etc. by the scanner 9 and a total of $mn$ stepping pulses during each complete revolution of the scanner. Pulse counter 18 thus reaches the limit of its capacity at the end of each arc and, upon the arrival of the next stepping pulse from photocell 16, returns to a zero reading and at the same time produces the stepping pulse to advance the counter 19 by one unit. Counter 19 is similarly reset after reaching its $m$th and last position, thus upon a complete revolution of arm 9. In FIG. 1 I have indicated at $p_1$ the location of the first pinpoint source of arc $a_1$ and at $p_n$ the location of the last source thereof; corresponding locations in arcs $a_2$ have been designated $p_{n+1}$ and $p_{2n}$ (immediately followed by source $p_{n+1}$ in the next arc) whereas the first and last sources of the final arc $a_m$ bear the designations $p_{(m-1)n+1}$ and $p_{mn}$.

Whenever the input end 10' of filament 10 picks up light from an output end 7 of one of the filaments 4, a control pulse indicating the presence of a target on the projection surface 1 is produced by photocell 20 and fed to the shift register 22 which, in two parallel memories not specifically illustrated, receives the instantaneous readings of counters 18 and 19 without interference with their setting. Thus, within the limit of the storage capacity of this register, any number of target locations from discrete points or from a continuous curve may be stored. The contents of register 22 may be visually displayed, recorded graphically or magnetically, or otherwise made available in digital form to an observer.

It will be noted that the fiber terminations 10", 11" are relatively staggered in axial direction and that the confronting terminations 14', 15' are complementarily staggered to prevent cross-illumination. The number and spacing of the two groups of fiber terminations 11" and 15' should be so chosen that in each of the total of $mn$ operative positions of the scanner there will be at least one fiber end 11" confronting a corresponding fiber end 15' to illuminate the photocell 16. If either group of fiber ends 11" and 15' contains as many filaments as there are operating positions (i.e. $mn$), the other group may be replaced by a single fiber; this is also true if, say, the terminations 11" are deformed to constitute a continuous tube.

The pinpoint light sources 8 associated with timing circuit 13 may also be modified; thus, the fibers 5 may be omitted and the disk 6 may be perforated or radially slotted at the level of fiber ends 11', the light source 23 being then positioned directly in front of the disk but suitably shielded from the conductors 4. Furthermore, the fiber-supporting member 6 need not be a circular disk. Also, it will be understood that the terms "rows" and "columns" do not necessarily convey a particular orientation (horizontal or vertical) in space. These and other modifications are intended to be embraced within the spirit and scope of my invention as defined in the appended claims.

I claim:

1. A device for registering, in orthogonal co-ordinates, the position of at least one luminous point on a surface, comprising a bundle of light-conductive filaments having input ends arranged in an orthogonal array of $n$ columns and $m$ rows, said filaments further having output ends spacedly distributed along a circle divided into $m$ arcs each containing the $n$ output ends of a respective row; optical scanning means rotatable about the center of said circle for picking up light pulses from said output ends upon illumination of the corresponding input ends; timing means for generating a stepping pulse upon movement of said scanning means past any one of said output ends; a first counter connected to said timing means for registering the number of said stepping pulses in each of said arcs, said first counter being resettable to zero by said timing means upon completed traverse of each arc by said scanning means; a second counter steppable through said first counter by said timing means for registering the number of arcs traversed, said second counter being resettable to zero by said timing means upon completion of a revolution by said scanning means; a single photoelectric transducer confronting said scanning means for converting said light pulses into electric control pulses; and register means responsive to said transducer for indicating the readings of said first and second counters upon the occurrence of a control pulse.

2. A device as defined in claim 1 wherein said scanning means includes a rotatable carrier and first light-conductive means on said carrier positioned to register with said output ends, said timing means comprising a multiplicity of pinpoint light sources respectively juxtaposed with said output ends, and second light-conductive means on said carrier positioned to register with said pinpoint light sources.

3. A device as defined in claim 2 wherein said pinpoint light sources comprise terminal portions of light-conductive fibers and a radiation source trained upon said fibers.

4. A device as defined in claim 2 wherein said light-conductive means comprise movable fiber-optical elements with a first set of juxtaposed extremities extending along the axis of rotation of said carrier, said scanning and timing means including extensions of said fiber-optical elements with a second set of extremities confronting said first set of extremities.

5. A device as defined in claim 4 wherein at least one of said sets of extremities includes an axially positioned central fiber and a tubular sheath of surrounding fibers.

6. A device as defined in claim 5 wherein said central fiber and said tubular sheath are relatively staggered in axial direction.

7. A device as defined in claim 1 wherein said first counter is adapted to return automatically to zero upon stepping past a count of $n$ and simultaneously to emit a stepping signal for said second counter, the latter being coupled to said first counter for advancing in response to said stepping signal.

References Cited

UNITED STATES PATENTS

| | | | |
|---|---|---|---|
| 3,069,079 | 12/1962 | Steinbuch et al. | 235—61.11 |
| 3,184,732 | 5/1965 | Haynes | 340—347 |
| 3,225,329 | 12/1965 | Rabinow | 340—146.3 |
| 3,390,274 | 6/1968 | Hunt | 250—231 |

MAYNARD R. WILBUR, Primary Examiner

J. M. THESZ, Jr., Assistant Examiner

U.S. Cl. X.R.

250—227; 340—380; 350—96